P. HEŸLANDT.
LAMP.
APPLICATION FILED AUG. 6, 1906.

914,954.

Patented Mar. 9, 1909.

Witnesses
O. M. Lawson
W. E. Palmer.

Inventor
Paulus Heÿlandt
G. Frank S. Appleman
Atty

UNITED STATES PATENT OFFICE.

PAULUS HEYLANDT, OF ERFURT, GERMANY, ASSIGNOR, BY DIRECT AND MESNE ASSIGNMENTS, TO SOCIETY "FLÜSSIGE LUFT" MASCHINEN UND APPARATE-SYSTEM PAULUS HEYLANDT G. M. B. H. OF HANOVER, GERMANY.

LAMP.

No. 914,954.

Specification of Letters Patent.

Patented March 9, 1909.

Application filed August 6, 1906. Serial No. 329,367.

*To all whom it may concern:*

Be it known that I, PAULUS HEYLANDT, a subject of the King of Prussia, and a resident at Karthäuserstrasse 65, Erfurt, Germany, have invented an Improved Lamp, of which the following is a full, clear, and complete specification.

The present invention relates to improvements in lamps or the like, of the type in which the vapor of a suitable combustible is generated and intimately mixed with gaseous oxygen generated from liquid oxygen or liquid air, said improvements being particularly applicable to soldering or welding lamps of the above type as they enable such to be manufactured in a form very suitable for mounting or fitting purposes. Said improvements are also especially applicable to lamps of the above type used for illumination when such lamps are required to be in a very handy form and to be comparatively light in weight, as for example, when they are for use on vehicles of all kinds.

The objects of the improvements are to increase the safety of such lamps and to facilitate their regulation and to improve their efficiency by arrangements which guarantee the intimate mixing of the combustible and oxygen on issuing from their respective outlets.

The improvements have as a further object to increase the durability of such lamps.

The improvements consist of the arrangements, dispositions and combinations of parts hereinafter set forth and claimed.

The accompanying drawing illustrates a lamp embodying the improvements according to the present invention.

Figure 1:
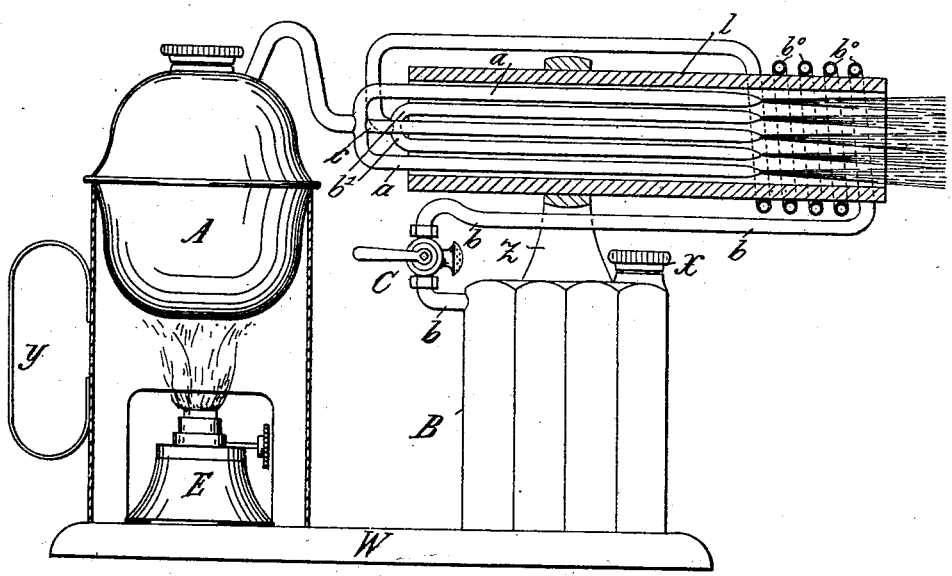
Figures 2, 3:
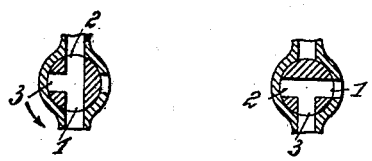

In said drawings:—Figure 1 is an elevation of the lamp, the burner being shown in cross section: Figs. 2 and 3 are transverse sections of a detail of Fig. 1 in different positions.

In Fig. 1 a receptacle A mounted firmly on a base W and provided with a handle Y is shown, which receptacle serves for containing the liquid combustible, for example, benzin. An ordinary lamp E is under the same for supplying the necessary heat to the receptacle A in order to vaporize the liquid combustible therein. The gaseous combustible flows out of the receptacle A in a plurality of pipes $a, c, a$, arranged axially inside the burner 1, in order to escape at the end of the same.

The vessel B of a suitable kind for liquid air or liquid oxygen, which is preferably provided with ribs or other means for increasing the outer surface in order to secure a sufficient evaporation, is mounted firmly on the base W and is fastened by means of a wrought iron strap Z or the like to the burner 1 and supplies oxygen to the benzin flame in the same through the pipe $b$. This pipe $b$ runs in the first place in a helix $b^\circ$, $b^\circ$ around the mouth of the burner and then along the same and goes inside the burner 1 in several branch pipes $b^1$, $b^1$, parallel to the benzin pipes $a, c, a$, and the gaseous oxygen coming directly from the liquid oxygen in the vessel B on leaving the pipes $b^1$, $b^1$, intimately mixes with the benzin vapor escaping from the pipes $a, c, a$. In this manner the greatest heat is developed at the mouth of the burner. But in consequence of the arrangement of the pipes and burner, the very cold gaseous oxygen coming from the vessel B protects the burner at its mouth from the damaging effect of the very great heat, as the cold oxygen circulates around the burner 1 through the helix $b^\circ$, $b^\circ$. At the same time a suitable warming of the oxygen to be supplied to the flame takes place beforehand.

In order to assure a supply of oxygen corresponding at all times to the consumption of the same and to regulate the supply, a three-way valve or tap C is arranged above the vessel B which can be set by hand. The purpose of this tap C is to be seen in Figs. 2 and 3. Fig. 2 shows the connection of the vessel B by way of 1, 2 with the pipe $b$, while in Fig. 3 the shutting off of this connection is shown; but here, on the contrary, the way 3, 1 to the open air is open, through which the air escapes which develops in the vessel B owing to the gasification which is always taking place even if very slightly.

What I claim as my invention and desire to secure by Letters Patent is:—

1. In a lamp of the type described, the combination with a receptacle for liquid combustible, of means for heating said receptacle to evaporate the combustible, a vessel for containing a liquid supporter of combustion, a tubular burner supported by said vessel, a plurality of parallel pipes in said burner, a pipe connecting one part of said pipes at the internal end of said burner with said receptacle, and another pipe connecting the other part of said pipes at the internal end of said burner with said vessel while surrounding in several turns the external end of said burner so as to cool same with the gasified supporter of combustion.

2. In a lamp of the type described, the combination with a receptacle for liquid combustible, of a lamp for heating said receptacle to evaporate the combustible, a vessel for containing a liquid supporter of combustion, a support on said vessel, a tubular burner secured in said support, a plurality of parallel pipes in said burner and terminating at a distance from the external end of same, a pipe connecting one part of said pipes at the internal end of said burner with said receptacle, and another pipe connecting the other part of said pipes at the internal end of said burner with said vessel while surrounding in several turns the external end of said burner so as to cool same with the gasified supporter of combustion.

3. In a lamp of the type described, the combination with a receptacle for liquid combustible, of means for heating said receptacle to evaporate the combustible, a vessel for containing a liquid supporter of combustion, a tubular burner supported by said vessel, a plurality of parallel pipes in said burner, a pipe connecting one part of said pipes at the internal end of said burner with said receptacle, a second pipe connecting the other part of said pipes at the internal end of said burner with said vessel while surrounding in several turns the external end of said burner so as to cool same with the gasified supporter of combustion, and a valve inserted in said second pipe and adapted to turn on the gasified supporter of combustion to the burner for use and to turn it off to the ambient air when not in use.

4. In a lamp of the type described, the combination with a receptacle for liquid combustible, of a lamp for heating said receptacle to evaporate the combustible, a vessel for containing a liquid supporter of combustion, a support on said vessel, a tubular burner secured in said support, a plurality of parallel pipes in said burner and terminating at a distance from the external end of same, a pipe connecting one part of said pipes at the internal end of said burner with said receptacle, a second pipe connecting the other part of said pipes at the internal end of said burner with said vessel while surrounding in several turns the external end of said burner so as to cool same with the gasified supporter of combustion, and a valve inserted in said second pipe and adapted to turn on the gasified supporter of combustion to the burner for use and to turn it off to the ambient air when not in use.

In testimony whereof I have signed my name to this specification in the presence of the two subscribing witnesses.

PAULUS HEYLANDT.

Witnesses:
LUDWIG FRANKE,
SIGMUND FLEYNE.